(12) United States Patent
Schulz et al.

(10) Patent No.: US 7,768,220 B2
(45) Date of Patent: Aug. 3, 2010

(54) HARMONIC TORQUE RIPPLE REDUCTION AT LOW MOTOR SPEEDS

(75) Inventors: Steven E. Schulz, Torrance, CA (US); Goro Tamai, West Bloomfield, MI (US); Silva Hiti, Redondo Beach, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 302 days.

(21) Appl. No.: 12/108,868

(22) Filed: Apr. 24, 2008

(65) Prior Publication Data

US 2009/0267555 A1 Oct. 29, 2009

(51) Int. Cl.
*H02P 6/10* (2006.01)

(52) U.S. Cl. .................. 318/432; 318/443; 318/400.02; 318/400.12; 700/286

(58) Field of Classification Search ................ 318/432, 318/443, 400.02, 400.12; 700/286
See application file for complete search history.

(56) References Cited

U.S. PATENT DOCUMENTS

| | | | | |
|---|---|---|---|---|
| 6,069,467 | A * | 5/2000 | Jansen | 318/802 |
| 6,828,752 | B2 * | 12/2004 | Nakatsugawa et al. | 318/801 |
| 6,838,848 | B2 * | 1/2005 | Shindo | 318/400.12 |
| 7,075,260 | B2 * | 7/2006 | Maeda | 318/443 |
| 7,151,354 | B2 * | 12/2006 | Yoshinaga et al. | 318/611 |
| 7,176,652 | B2 * | 2/2007 | Wakabayashi et al. | 318/400.02 |
| 7,243,006 | B2 * | 7/2007 | Richards | 700/286 |
| 7,286,906 | B2 * | 10/2007 | Richards | 700/286 |
| 7,474,067 | B2 * | 1/2009 | Ueda et al. | 318/432 |
| 7,671,552 | B2 * | 3/2010 | Tonami et al. | 318/400.02 |
| 2003/0062868 | A1 * | 4/2003 | Mir et al. | 318/599 |
| 2003/0227271 | A1 * | 12/2003 | Shindo | 318/439 |
| 2004/0169482 | A1 * | 9/2004 | Maeda | 318/443 |
| 2005/0073280 | A1 * | 4/2005 | Yoshinaga et al. | 318/727 |
| 2006/0192512 | A1 * | 8/2006 | Maeda | 318/432 |
| 2006/0192513 | A1 * | 8/2006 | Maeda | 318/443 |
| 2006/0192516 | A1 * | 8/2006 | Maeda | 318/650 |
| 2007/0052381 | A1 * | 3/2007 | Ueda et al. | 318/432 |
| 2009/0021194 | A1 * | 1/2009 | Tonami et al. | 318/400.02 |

OTHER PUBLICATIONS

Wu, A.P. et al. "Cancellation of Torque Ripple Due to Nonidealities of Permanent Magnet Synchronous Machine Drives," IEEE Power Electronics Specialist Conference, 2003, pp. 256-261, vol. 1.

(Continued)

*Primary Examiner*—Paul Ip
(74) *Attorney, Agent, or Firm*—Ingrassia Fisher & Lorenz, P.C.

(57) ABSTRACT

Methods and systems are provided for reducing torque ripple in an electric motor. A method comprises receiving a torque command and determining a cancellation current command based on the torque command. The method further comprises generating a harmonic cancellation command based on the cancellation current command, wherein the harmonic cancellation command compensates for a phase shift and an attenuation introduced by a current regulated control module coupled to an inverter coupled to the electric motor. The method further comprises providing the harmonic cancellation command to the current regulated control module, wherein the current regulated control module is configured to control the inverter in response to the harmonic cancellation command and the torque command.

20 Claims, 7 Drawing Sheets

OTHER PUBLICATIONS

Chapman, P.L. et al. "Optimal Current Control Strategies for Surface-Mounted Permanent-Magnet Synchronous Machine Drives," IEEE Transaction on Energy Conversion, Dec. 1999, pp. 1043-1050, vol. 14, No. 4.

Kang, C. et al. "An Efficient Torque Control Algorithm for BLDCM with a General Shape of Back EMF," 24th Annual IEEE Power Electronics Specialist Conference, 1993, pp. 451-457.

Lu, C.W. et al. "Novel Approach to Current Profiling for AC Permanent Magnet Motors," IEEE Transactions on Energy Conversion, Dec. 1999, pp. 1294-1299, vol. 14, No. 4.

Favre, E. et al. "Permanent-Magnet Synchronous Motors: a Comprehensive Approach to Cogging Torque Suppression," IEEE Transactions on Industry Applications, Nov./Dec. 1993, pp. 1141-1149, vol. 29, No. 6.

Choi, J. et al. "Novel Periodic Torque Ripple Compensation Scheme in Vector Controlled AC Motor Drives," Thirteenth Annual Applied Power Electronics Conference, 1998, pp. 81-85, vol. 1.

Hung, J.Y. et al. "Minimization of Torque Ripple in Permanent Magnet Motors: a Closed Form Solution," IEEE Power Electronics and Motion Control, 1992, pp. 459-463, vol. 1.

Le-Huy, H. et al. "Minimization of Torque Ripple in Brushless DC Motor Drives," IEEE Transactions on Industry Applications, Jul./Aug. 1986, pp. 748-755, vol. IA-22, No. 4.

Lee, S. et al. "A Harmonic Reference Frame Based Current Controller for Active Filter," IEEE School of Electrical Engineering, 2000, pp. 1073-1078.

* cited by examiner

HARMONIC TORQUE RIPPLE REDUCTION AT LOW MOTOR SPEEDS

TECHNICAL FIELD

Embodiments of the subject matter described herein relate generally to electric motor drive systems, and more particularly, embodiments of the subject matter relate to methods and apparatus for reducing torque ripple in electric motors utilized in electric and hybrid-electric vehicle drive systems.

BACKGROUND

In vehicles using electric traction motors, alternating current (AC) motor drives are used to provide a requested torque to the motor shaft. Most motor drives attempt to provide a balanced set of purely sinusoidal currents to the motor stator windings to produce a constant torque with no distortion or ripple. However, due to practical design constraints of the AC motor, torque ripple exists even with purely sinusoidal stator current excitation. Torque ripple may cause speed ripple, excite driveline resonances, or produce other undesirable effects. In the case of a vehicle, torque ripple may produce vehicle oscillations or noise.

In some situations, the torque ripple generated by a motor can be reduced by making mechanical changes to the motor design, such as the winding configuration, stator tooth geometry, rotor barrier geometry, and rotor skewing. However, there is a trade-off between torque ripple and torque density of the motor. Therefore, in all practical applications, the motor produces some torque ripple when supplied by a sinusoidal current. Passive damping methods, such as the addition of structural reinforcement or sound dampening materials to the vehicle, may be utilized to reduce some of the adverse affects of torque ripple and mitigate acoustic noise. However, these damping methods can be costly and do not directly address the problem of torque ripple produced by the motor.

In the case of hybrid or electric vehicles, higher level supervisory controllers may employ algorithms such as active damping which attempt to modulate the torque command provided to the AC motor drive in order to minimize excitation of driveline resonances due in part to the torque ripple. However, these algorithms typically cannot operate at very low speeds, as they can not differentiate between the modulation of the driver requested torque command and oscillations induced by the torque ripple of the AC motor. Alternative techniques attempt inject a harmonic cancellation current in the fundamental synchronous frame. However, these techniques fail to address the effects of current regulator bandwidth limitations on the system, which could possibly lead to increased torque ripple.

BRIEF SUMMARY

A method is provided for reducing torque ripple in an electric motor. The electric motor is coupled to an inverter, which is coupled to a current regulated control module, wherein the inverter is configured to drive the electric motor. The method comprises receiving a torque command and determining a cancellation current command based on the torque command. The method further comprises generating a harmonic cancellation command based on the cancellation current command, wherein the harmonic cancellation command is generated to compensate for a phase shift and an attenuation introduced by the current regulated control module, and providing the harmonic cancellation command to the current regulated control module, wherein the current regulated control module is configured to control the inverter in response to the harmonic cancellation command and the torque command.

A method is provided for reducing torque ripple in an electric motor in response to a torque command. The electric motor is coupled to an inverter, which is coupled to a current regulated control module, wherein the inverter is configured to drive the electric motor. The method comprises determining a harmonic cancellation command based on the torque command, wherein the harmonic cancellation command is adjusted to compensate for a phase shift introduced by the current regulated control module, and providing the harmonic cancellation command to the current regulated control module.

An apparatus is provided for a controller for reducing torque ripple in an electric motor in response to a torque command, wherein the electric motor is coupled to an inverter. The controller comprises a current regulated control module, wherein the current regulated control module generates control signals for the inverter in response to the torque command, and a harmonic cancellation command block coupled to the current regulated control module. The harmonic cancellation command block is configured to generate a harmonic cancellation command for the current regulated control module to reduce a torque ripple harmonic, wherein the harmonic cancellation command compensates for a phase shift introduced by the current regulated control module.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
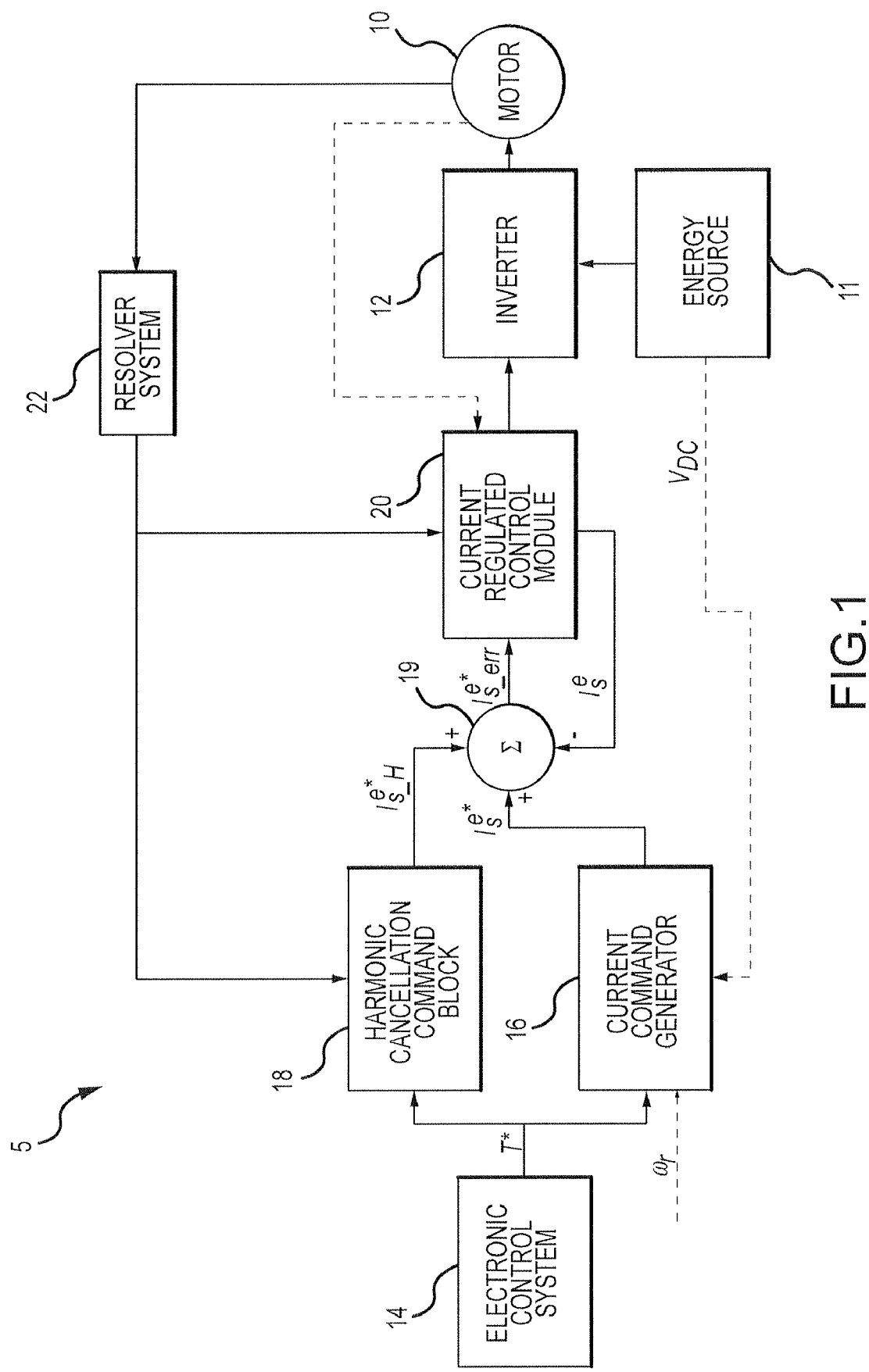
FIG. 1 is a block diagram of an electric motor drive system in accordance with one embodiment.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematic shown in the figures may depict one exemplary arrangement of elements, additional intervening elements, devices, features, or components may be present in an embodiment of the depicted subject matter.

For the sake of brevity, conventional techniques related to some functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts discussed herein relate to reducing torque ripple in electric motor drive systems. As used herein, the meaning of subscription and superscription is as follows:

Subscript d and q: Quantity in the d-q frame. The d-q frame of reference, in Cartesian coordinates, is synchronous with the rotation of a rotor within the electric motor.

Subscript s: Quantity in the stator windings of the electric motor.

Superscript e: Quantity in the rotating (synchronous) frame.

Superscript r: Quantity related to the machine rotor.

Superscript *: Quantity which is commanded.

Referring to FIG. 1, in an exemplary embodiment, an electric motor system 5 includes, without limitation: an electric motor 10, an energy source 11, an inverter 12, an electronic control system 14, a current command generator block 16, a harmonic cancellation command block 18, a summing junction 19, a current regulated control module 20, and a resolver system 22.

In an exemplary embodiment, the electric motor 10 is coupled to the inverter 12 which is coupled to the energy source 11. The electronic control system 14 is coupled to the current command generator block 16 and the harmonic cancellation command block 18. The current command generator block 16 may be further coupled to the energy source 11. The output of the current command generator block 16 and output of the harmonic cancellation command block 18 feed the summing junction 19, which also receives an output from the current regulated control module 20. The output of the summing junction 19 is coupled to the current regulated control module 20. The current regulated control module 20 may be further coupled to the electric motor 10, and it feeds the summing junction 19 to create a feedback loop. The resolver system 22 is coupled to the electric motor 10, and is further coupled to the harmonic cancellation command block 18 and the current regulated control module 20 to provide information regarding operation of the electric motor 10.

In an exemplary embodiment, the electric motor 10 is a three-phase alternating current (AC) electric machine having a rotor and stator windings. In various embodiments, the electric motor 10 may be an internal permanent magnet (IPM) motor, an induction motor, a synchronous reluctance motor, or another suitable motor as will be understood. Further, it should be understood that the subject matter discussed herein is not limited to three-phase machines, and may be adapted for any number of phases. In an exemplary embodiment, the energy source 11 provides electrical energy and/or voltage to the inverter 12 for driving the electric motor 10. The energy source 11 may comprise a battery, a fuel cell, an ultracapacitor, or any other suitable energy source known in the art. The electric motor 10 operates in response to voltage applied to the stator windings from the inverter 12, which creates torque-producing current in the stator windings. In an exemplary embodiment, the inverter 12 provides pulse-width modulated (PWM) voltage signals to each phase of the stator windings and may comprise a plurality of transistor switch pairs for modulating the voltage provided, as is understood in the art.

In an exemplary embodiment, the electronic control system 14 may include various sensors and automotive control modules, electronic control units (ECUs), or at least one processor and/or a memory which includes instructions stored thereon (or in another computer-readable medium) for carrying out the processes and methods as described below. Although not shown, the electronic control system 14 may be coupled to additional vehicle components, as will be appreciated in the art. In an exemplary embodiment, the electronic control system 14 generates a torque command (T*) in response to a request for torque, and provides the torque command to the current command generator block 16 and the harmonic cancellation command block 18.

In an exemplary embodiment, the current command generator block 16 generates a synchronous stator current command ($I_s^{e*}$) at a fundamental electrical frequency ($f_e$) to operate the electric motor 10 with the commanded torque. In accordance with one embodiment, the synchronous stator current command is realized as two components relative to the d-q reference frame, $I_{ds}^{e*}$ and $I_{qs}^{e*}$, discussed in greater detail below (see FIG. 2). In an exemplary embodiment, the current command, $I_s^{e*}$, is based on the torque command (T*), the energy source voltage ($V_{DC}$), the angular velocity of the motor ($\omega_r$), and possibly other operating parameters of the electric motor system 5. The current command generator block 16 provides the current command $I_s^{e*}$ to the summing junction 19.

In an exemplary embodiment, the harmonic cancellation command block 18 provides a second current command ($I_{s\_H}^{e*}$) to the summing junction 19 to cancel torque ripple harmonics in the electric motor 10 for one or more multiples of the fundamental electrical frequency. In accordance with one embodiment, the harmonic cancellation command may be realized in the d-q reference frame as $I_{ds\_H}^{e*}$ and $I_{qs\_H}^{e*}$ discussed in greater detail below (see FIG. 2). The harmonic cancellation command block 18 is configured to perform additional tasks and functions as described in greater detail below.

In an exemplary embodiment, the current regulated control module 20 provides measured current ($I_s^e$) feedback from the electric motor 10 to the summing junction 19. The output of the summing junction 19 is a current error command ($I_{s\_err}^{e*}$) that represents $I_s^{e*}+I_{s\_H}^{e*}-I_s^e$. In accordance with one embodiment, the current regulated control module 20 generates three-phase voltage commands based on the current error command, $I_{s\_err}^{e*}$. The current regulated control module 20 provides three-phase voltage commands to the inverter 12 to produce the commanded torque in the electric motor 10. In an exemplary embodiment, the current regulated control module 20 regulates the current in the electric motor 10, as described in greater detail below.

Figure 2:
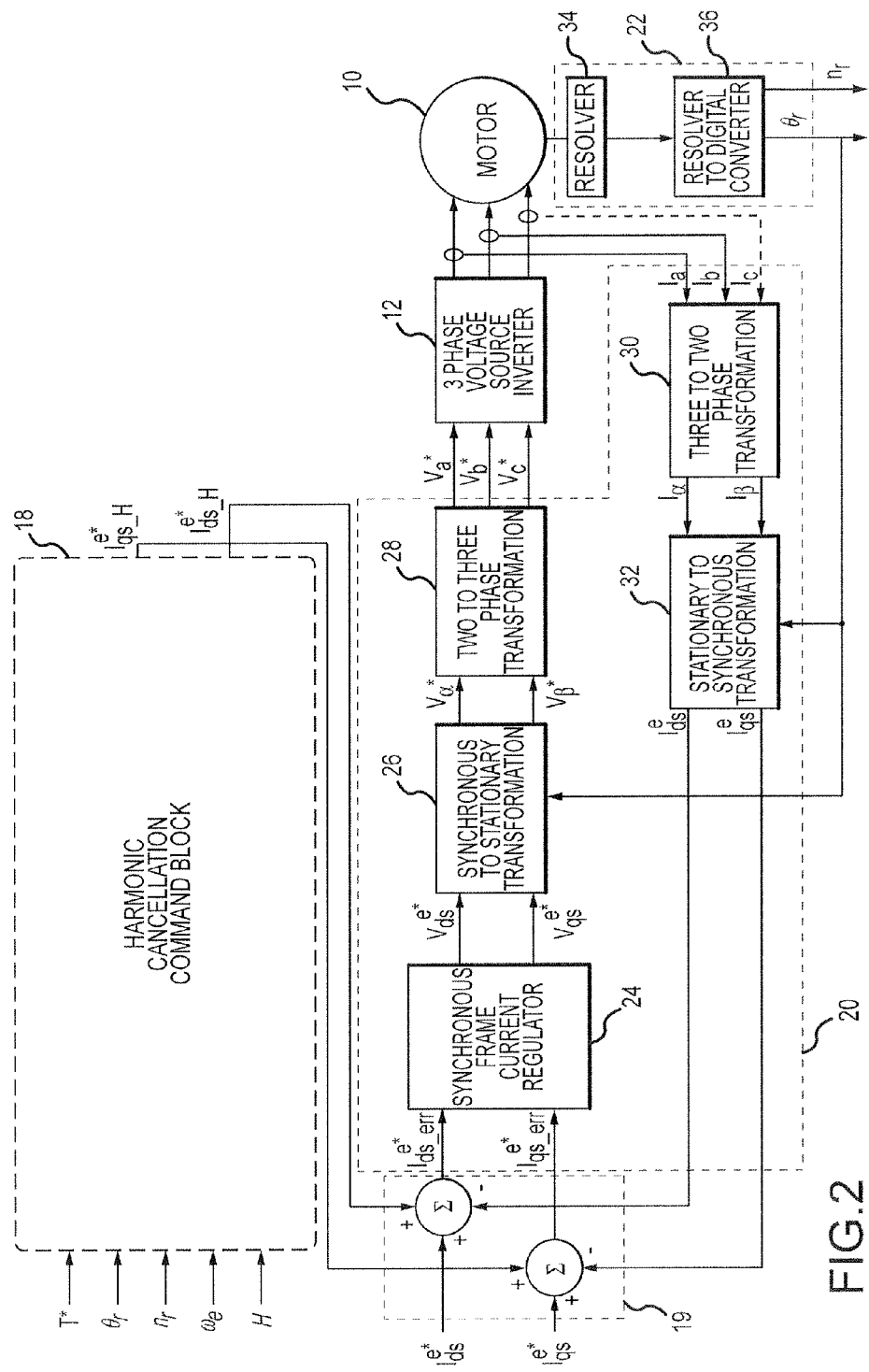
FIG. 2 is a detailed block diagram of the electric motor drive system of FIG. 1 for a d-q reference frame implementation illustrating additional components and intermediate signals between components in accordance with one embodiment.

Referring now to FIG. 2, in an exemplary embodiment, the electric motor system 5 is implemented in the d-q reference frame. In an exemplary embodiment, the current regulated control module 20 includes a synchronous frame current regulator 24, a synchronous to stationary transformation block 26, a two to three phase transformation block 28, a three to two phase transformation block 30, and a stationary to synchronous transformation block 32. The resolver system 22 includes a resolver 34 and a resolver to digital converter 36.

In an exemplary embodiment, the output of the summing junction 19 is coupled to the synchronous frame current regulator 24. The synchronous frame current regulator 24 is coupled to the synchronous to stationary transformation block 26, which is coupled to the two to three phase transformation block 28, which in turn is coupled to the inverter 12. The three to two phase transformation block 30 is coupled to the electric motor 10 and to the stationary to synchronous transformation block 32, which is coupled to the summing junction 19 to create a feedback loop as shown.

Referring again to FIG. 2, in an exemplary embodiment, the current error command is provided to the synchronous frame current regulator 24. The synchronous frame current regulator 24 regulates the motor current by providing voltage commands such that the measured current in the electric motor 10 tracks the current command ($I_s^{e*}+I_{s\_H}^{e*}$). The outputs of the synchronous frame current regulator 24 are intermediate voltage commands $V_{ds}^{e*}$ and $V_{qs}^{e*}$, which are processed by the synchronous to stationary transformation block 26, which uses rotor position $\theta_r$ (e.g., from the resolver system 22 as described below) to transform the voltage commands from the synchronous reference frame to the stationary reference frame in accordance with conventional coordinate transformation. The outputs of the synchronous to stationary transformation block 26 are the stationary frame two phase alpha/beta voltage commands $V_\alpha^*$ and $V_\beta^*$. The alpha/beta voltage commands are then passed to the two to three phase transformation block 28, which converts the alpha/beta voltage commands to the equivalent three-phase signals $V_a^*$, $V_b^*$, and $V_c^*$. The 3-phase stationary frame voltage commands $V_a^*$, $V_b^*$, $V_c^*$ are the operational control signals passed to the inverter 12, which processes the voltage commands and applies the commanded voltages to stator windings of the electric motor 10.

In an exemplary embodiment, two (or three) stator phase currents are sensed and passed to the three to two phase transformation block 30. The three to two phase transformation block 30 converts the three phase currents $I_a$, $I_b$ and $I_c$ to equivalent two phase alpha/beta currents $I_\alpha$ and $I_\beta$. The stationary to synchronous transformation block 32 transforms (using rotor position $\theta_r$ which may be provided by the resolver system 22 as described below) the alpha/beta currents to synchronous frame quantities $I_{ds}^e$ and $I_{qs}^e$, which are fed back to the summing junction 19 as shown to create a current control feedback loop. The outputs of the summing junction 19 (i.e., the current error commands) are the synchronous frame error signals, which are provided to inputs of the synchronous frame current regulator 24.

In an exemplary embodiment, the resolver system 22 comprises a resolver 34 coupled to the electric motor 10. The output of the resolver 34 is coupled to a resolver to digital converter 36. The resolver to digital converter 36 generates a digital representation of the rotor position, which is provided to the synchronous to stationary transformation block 26, the stationary to synchronous transformation block 32, and the harmonic cancellation command block 18.

Referring again to FIG. 2, in an exemplary embodiment, the resolver system 22 measures the rotor position ($\theta_r$) and the motor speed ($n_r$) and provides the measured values to other system components. The resolver 34 (or similar speed sensing device) senses the position of the rotor and, thereby, derives the speed of the electric motor 10. The resolver to digital converter 36 converts the signals from the resolver 34 to digital signals (e.g., a digital motor speed signal and a digital rotor angular position signal), as is understood in the art. The resolver system 22 may provide digital representations of rotor position and motor speed to the harmonic cancellation command block 18, the current regulated control module 20, and/or other system components as described herein.

For the implementation depicted in FIG. 2, the harmonic cancellation command block 18 generates $I_{ds\_H}^{e*}$ and $I_{qs\_H}^{e*}$ in response to the torque command and other system parameters. Both outputs of the harmonic cancellation control block 18 are fed to the summing junction 19. Thus, the harmonic cancellation control block 18 influences the operation of the current regulated control module 20.

Referring again to FIG. 2, the current control feedback loop introduces a bandwidth frequency limitation (i.e., a cutoff frequency) to the frequency response of the current regulated control module 20. The bandwidth frequency ($f_{bw}$) is governed in part by the maximum switching frequency of the PWM inverter 12 and sampling rate of the electric motor system 5, which are two factors limiting the achievable bandwidth of the current regulated control module 20. In an exemplary embodiment, the bandwidth frequency may range from 300-500 Hz, although in other embodiments, the bandwidth frequency may be 1 kHz or greater. The bandwidth limitation of the current regulated control module 20 introduces attenuation and phase shift which affects the current regulated control module 20 frequency response. This limits the ability of the synchronous frame current regulator 24 to faithfully track the harmonic cancellation command when the command frequencies approach or exceed $f_{bw}$.

Figure 3:
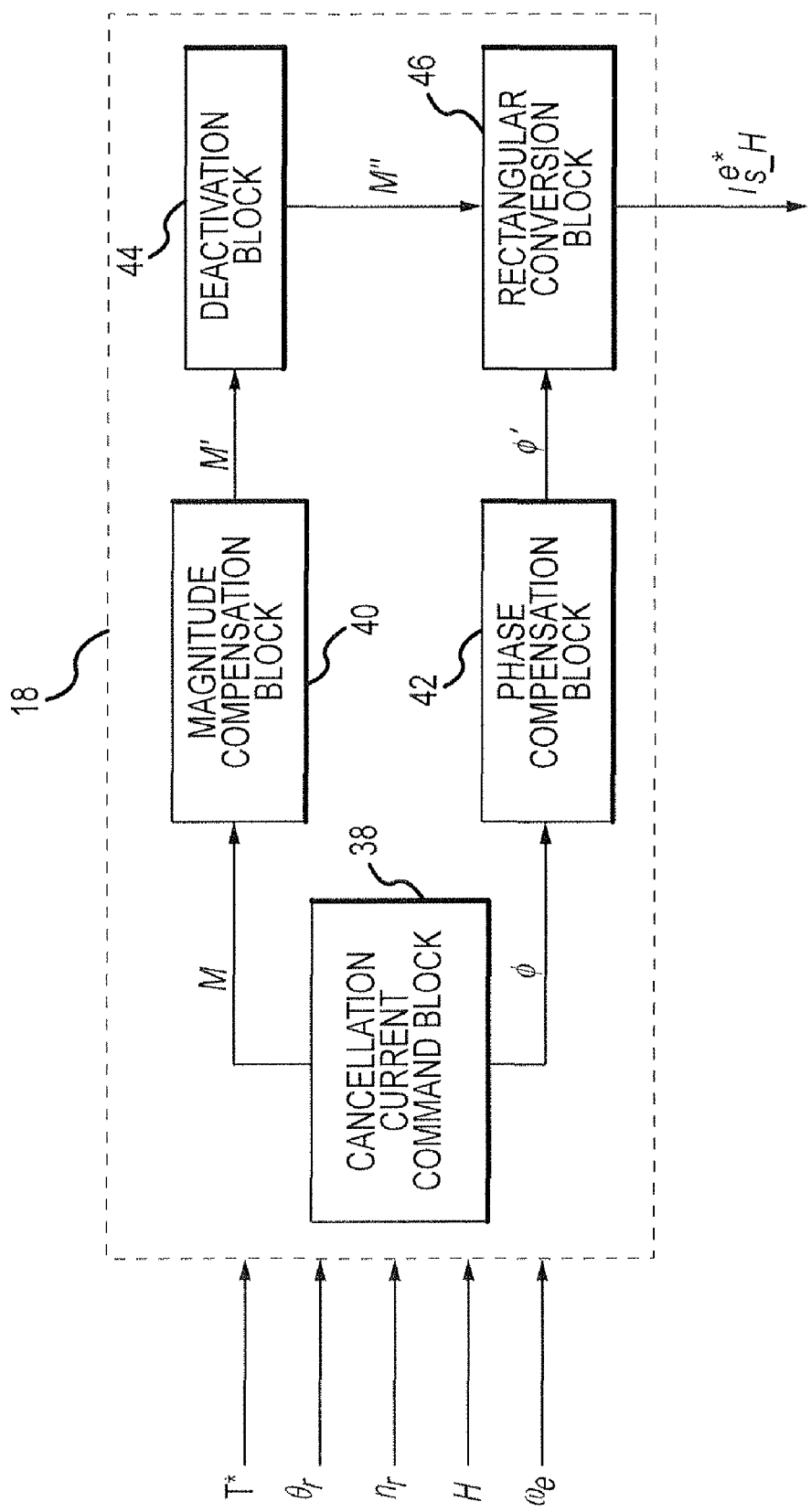
FIG. 3 is a block diagram of a harmonic cancellation command block in accordance with one embodiment.
Figure 4:
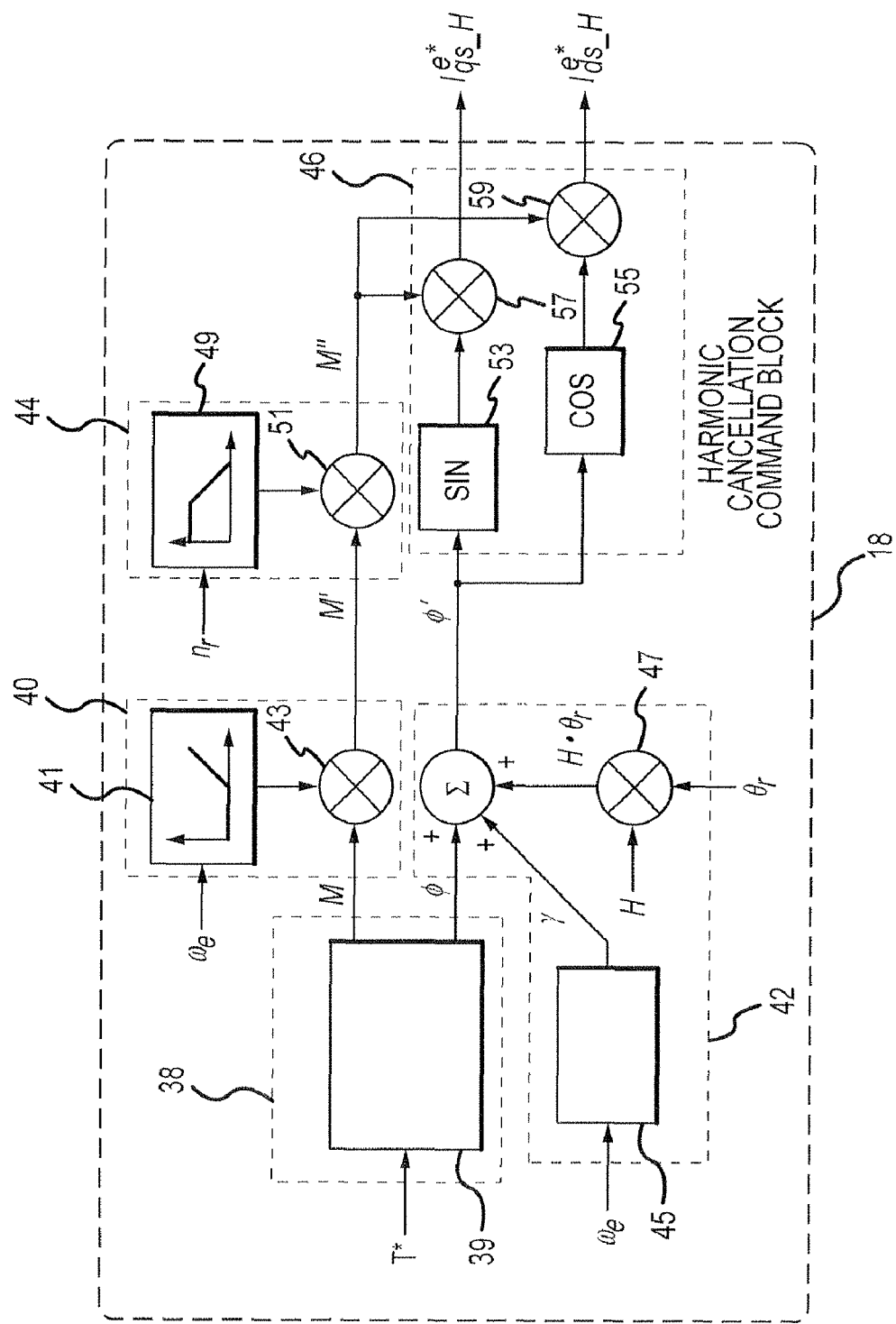
FIG. 4 is a detailed block diagram of the harmonic cancellation command block of FIG. 3 for a d-q reference frame implementation illustrating additional components and intermediate signals between components in accordance with one embodiment

Referring now to FIG. 3 and FIG. 4, in an exemplary embodiment, the harmonic cancellation command block 18 generates a harmonic cancellation command, $I_{s\_H}^{e*}$, to reduce torque ripple caused by an identified ripple harmonic, H. In an exemplary embodiment, the harmonic cancellation command block 18 includes, without limitation: a cancellation current command block 38, a magnitude compensation block 40, a phase compensation block 42, a deactivation block 44, and a rectangular conversion block 46. The harmonic cancellation command block 18 may receive as inputs a torque command (T*), rotor position ($\theta_r$), motor speed ($n_r$), electrical angular velocity ($\omega_e = 2\pi f_e$), current regulator bandwidth ($\omega_{bw}$), and/or the ripple harmonic to be cancelled (H). As shown in FIG. 4, the harmonic cancellation command block 18 may be realized and/or implemented in the d-q reference frame.

In the illustrated embodiment, the cancellation current command block 38 is coupled to the magnitude compensation block 40 and the phase compensation block 42. The output of the magnitude compensation block 40 is coupled to the input of the deactivation block 44. The output of the deactivation block 44 and the output of the phase compensation block 42 are coupled to the rectangular conversion block 46. As shown in FIG. 2, the output of the rectangular conversion block 46 is coupled to the summing junction 19. In an exemplary embodiment, the magnitude compensation block 40 compensates for the attenuation of the current regulated control module 20 and the phase compensation block 42 compensates for the phase shift of the current regulated control module 20, as described in greater detail below.

Figure 5:
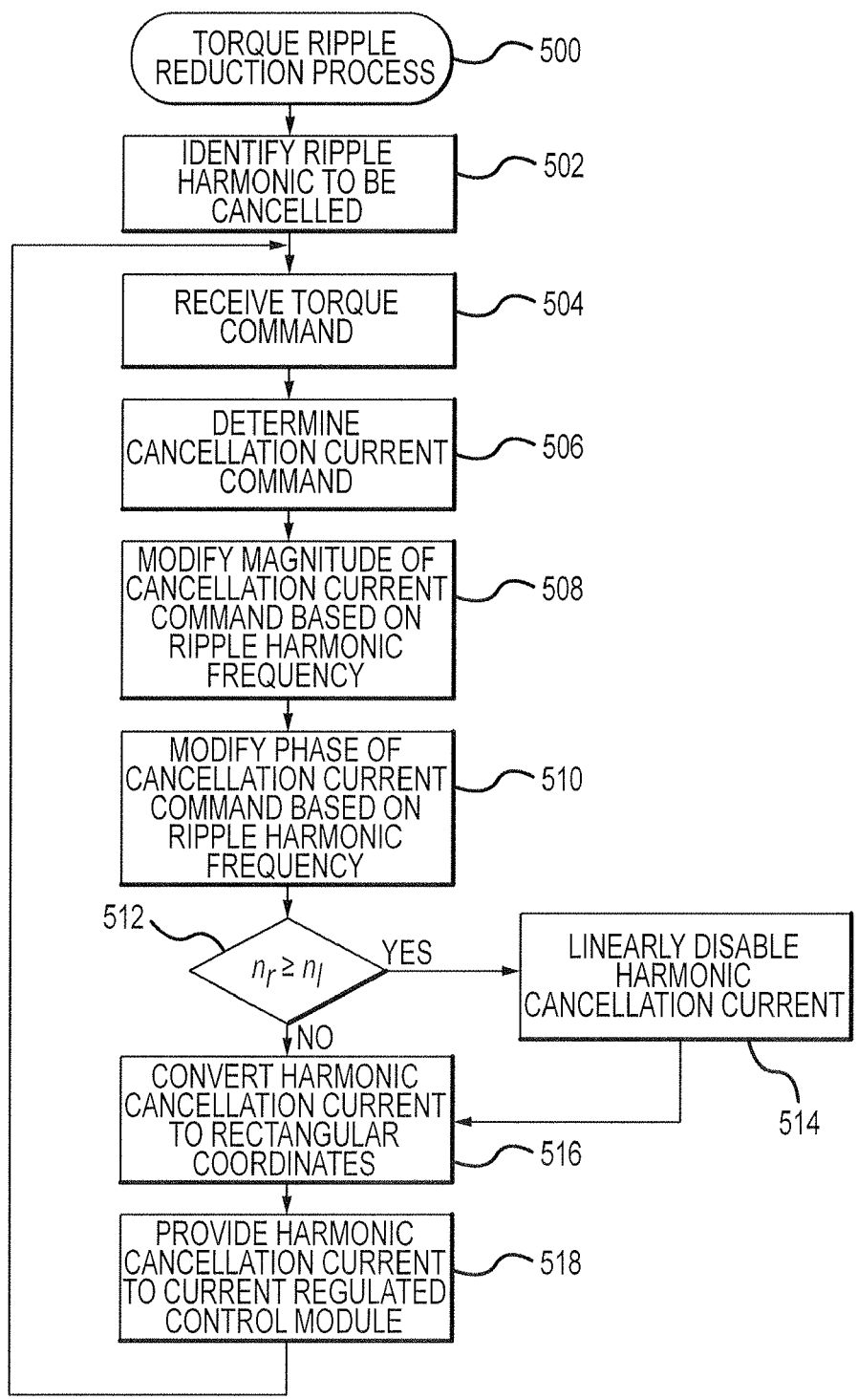
FIG. 5 is a flow diagram of a process for reducing torque ripple harmonics at low motor speeds in accordance with one embodiment.

Referring now to FIG. 5, in an exemplary embodiment, the harmonic cancellation command block may be configured to perform a torque ripple reduction process 500 and additional tasks, functions, and operations described below. The various tasks may be performed by software, hardware, firmware, or any combination thereof. For illustrative purposes, the following description may refer to elements mentioned above in connection with FIGS. 1-4. In practice, the tasks, functions, and operations may be performed by different elements of the described system. It should be appreciated any number of additional or alternative tasks may be included, and may be incorporated into a more comprehensive procedure or process having additional functionality not described in detail herein.

Referring again to FIG. 5, and with continued reference to FIG. 3 and FIG. 4, in an exemplary embodiment, a ripple harmonic to be cancelled is identified, H (task 502). In accordance with one embodiment, H is an integer multiple representing a harmonic of the fundamental electrical frequency that causes torque ripple. In an exemplary embodiment, the ripple harmonic may be predetermined based on motor operating characteristics and preconfigured in the harmonic cancellation command block 18. In accordance with another embodiment, the ripple harmonic may be produced external to the harmonic cancellation command block 18 (i.e., provided to the harmonic cancellation command block 18 from the electronic control system or another vehicle control module). In an exemplary embodiment, the harmonic cancellation command block 18 generates the harmonic cancellation command based on the identified ripple harmonic.

In an exemplary embodiment, the harmonic cancellation command block is configured to receive a torque command, T* (task 504). The torque command may be provided to the cancellation current command block 38 from the electronic control system or another control module within a vehicle in response to a user request for torque (i.e., a driver of a vehicle depressing an accelerator pedal).

In an exemplary embodiment, the cancellation current command block 38 determines a cancellation current command based on the torque command (task 506). The cancellation current command block 38 provides a cancellation current command for the harmonic frequency (H*$f_e$) based on the torque command and predetermined torque characteristics of the electric motor. The torque ripple characteristics of the electric motor are a complex function of the motor design, including stator and rotor lamination geometry and the winding configuration. In an exemplary embodiment, the predetermined torque characteristics may be determined either empirically, or by finite element analysis (FEA). In accordance with one embodiment, the cancellation current command block 38 determines the cancellation current command by obtaining the cancellation current command from a lookup table 39 containing stored current cancellation commands corresponding to a range of possible input torque commands. In another embodiment, the cancellation current command block 38 may determine the cancellation current command by performing a polynomial curve fitting operation on the torque command. In the exemplary embodiment, the cancellation current command is a polar quantity having a magnitude (M) and a cancellation phase angle ($\phi$), as labeled in FIG. 4.

In an exemplary embodiment, the harmonic cancellation command block 18 generates the harmonic cancellation command by modifying the magnitude of the cancellation current command based on the identified ripple harmonic frequency to compensate for the attenuation of the current regulated control module (task 508). The current regulated control module may be modeled as a single pole low pass filter, with a pole at the bandwidth frequency ($\omega_{bw} = 2\pi f_{bw}$), wherein the gain of the current regulator has a frequency response $$G(\omega) = \frac{1}{\sqrt{1 + \left(\frac{\omega}{\omega_{bw}}\right)^2}}.$$

Accordingly, the attenuation increases (or the magnitude of the gain decreases) as command frequencies provided to the current regulated control module increase (i.e., $\omega \to \omega_{bw}$). In an exemplary embodiment, to compensate for attenuation, the magnitude compensation block 40 generates an adjusted magnitude (M') by multiplying the magnitude by a compensating factor, such that $$M' = M \times \sqrt{1 + \left(\frac{H \cdot \omega_e}{\omega_{bw}}\right)^2}.$$

Referring to FIG. 4, the magnitude compensation block 40 may include a gain compensation operation block 41 coupled to a first multiplier 43 which receives the cancellation current command magnitude M as an input. The gain compensation operation block 41 evaluates $$\sqrt{1 + \left(\frac{H \cdot \omega_e}{\omega_{bw}}\right)^2}$$

and provides the result to a first multiplier 43 to produce M'. In accordance with one embodiment, the bandwidth frequency of the current regulated control module may be predetermined and the magnitude compensation block 40 may be preconfigured accordingly.

In an exemplary embodiment, the harmonic cancellation command block 18 generates the harmonic cancellation command by modifying the cancellation phase angle to compensate for the phase shift of the current regulated control module (task 510). As discussed above, the current regulated control module may be modeled as a single pole low pass filter, with a pole at the bandwidth frequency ($\omega_{bw}=2\pi f_{bw}$), such that the phase shift of the current regulated control module is governed by $$\gamma = \tan^{-1}\left(\frac{H \times \omega_e}{\omega_{bw}}\right).$$

Referring to FIG. 4, the phase compensation block 42 may include a phase correction block 45 which evaluates $$\tan^{-1}\left(\frac{H \times \omega_e}{\omega_{bw}}\right)$$

to produce γ. Additionally, the location of the identified ripple harmonic must be accounted for by adding a harmonic phase angle corresponding to the harmonic position, governed by H×θ$_r$, which may be generated by a second multiplier 47. In an exemplary embodiment, the phase compensation block 42 modifies the cancellation phase angle by adding a compensating phase shift and a harmonic phase angle, wherein the harmonic cancellation phase angle is governed by φ'=φ+γ+H×θ$_r$.

Referring again to FIG. 4, in an exemplary embodiment, the deactivation block 44 is configured to disable the harmonic cancellation command if the motor speed ($n_r$) is greater than a threshold speed ($n_{th}$) (task 512, 514). In this regard, the deactivation block 44 may be implemented with a scaling factor block 49 and a third multiplier 51 which receives M' as an input. The scaling factor block 49 calculates a scaling factor $d_n$ which is provided to the third multiplier 51 to disable the harmonic cancellation command as speed increases. As the speed increases, the fundamental electrical frequency increases ($f_e$), which causes the frequency of the harmonic cancellation command (i.e., H×$f_e$) to approach the switching frequency of the inverter. At some point the ratio of the harmonic frequency to the switching frequency reaches a level where the harmonic cancellation command is no longer effective because of pulse ratio (ratio of the harmonic frequency to the output PWM frequency) restrictions. Accordingly, the harmonic cancellation command is deactivated as speed increases.

In an exemplary embodiment, the resolver system 22 may provide the motor speed, $n_r$, to the deactivation block 44. In alternative embodiments, the motor speed may be calculated based on $$n_r = \frac{120 f_e}{p},$$

where p is the number of poles in the electric motor. In an exemplary embodiment, the magnitude of the harmonic cancellation command is modified by multiplying the adjusted magnitude by a scaling factor to smoothly disable the harmonic cancellation command between a first speed ($n_1$) and the threshold speed. For example, the scaling factor $d_n$ may linearly vary from 1 at speed $n_1$ to 0 at speed $n_{th}$ (and speeds thereafter), such that for $n_{th} \geq n_r \geq n_1$, M"=$d_n$×M'.

In an exemplary embodiment, the rectangular conversion block 46 converts the harmonic cancellation command from a polar quantity (having magnitude M" and phase φ') to a rectangular quantity (task 516). In an exemplary embodiment, the rectangular conversion block 46 generates the harmonic cancellation command in the d-q synchronous reference frame, wherein $I_{ds\_H}^{e*}$=M" cos φ' and $I_{qs\_H}^{e*}$=M" sin φ'. Referring to FIG. 4, the rectangular conversion block 46 may be realized as sine operator block 53, a cosine operator block 55, a fourth multiplier 57 and a fifth multiplier 59. The sine operator block 53 and cosine operator block 55 each receive the harmonic cancellation phase angle φ' and perform the sine and cosine function of φ', respectively. The fourth multiplier 57 receives the output of the sine operator block 53 and M" as inputs and produces $I_{qs\_H}^{e*}$. The fifth multiplier 59 receives the output of the cosine operator block 55 and M" as inputs and produces $I_{ds\_H}^{e*}$. The harmonic cancellation command block provides the harmonic cancellation command to the current regulated control module via the summing junction 19 (task 518). The torque ripple reduction process 500 operates continually and the loop defined by tasks 504, 506, 508, 510, 512, 514, 516, and 518 may repeat and respond to changes within the system, for example, changes to the torque command, T*, or the rotor position.

Figure 6:
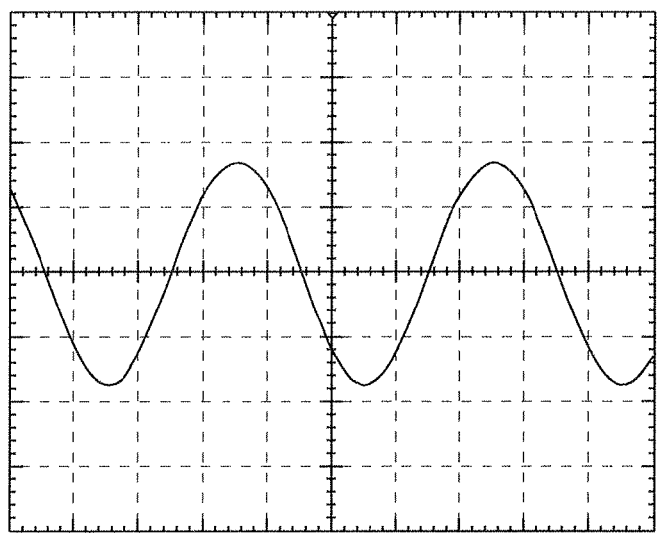
FIG. 6 is a graph of a sinusoidal current provided to a motor for an exemplary case.
Figure 7:
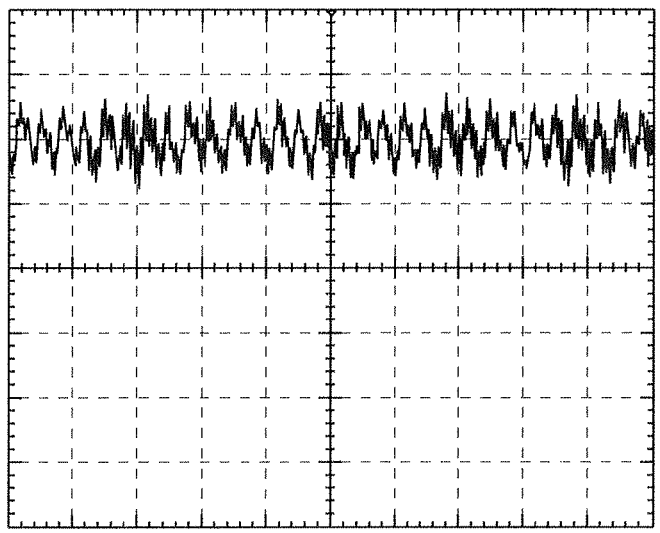
FIG. 7 is a graph of the torque produced by the motor in response to the sinusoidal current of FIG. 6 for an exemplary case.
Figure 8:
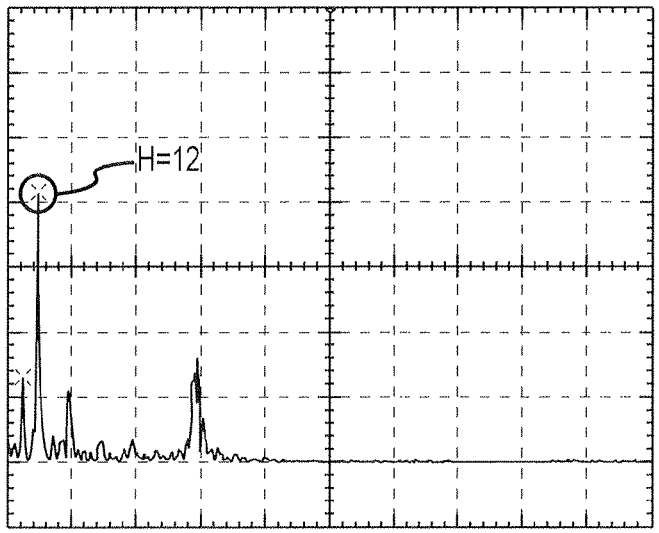
FIG. 8 is a graph of a fast Fourier transform (FFT) of the motor torque in FIG. 7 for an exemplary case.
Figure 9:
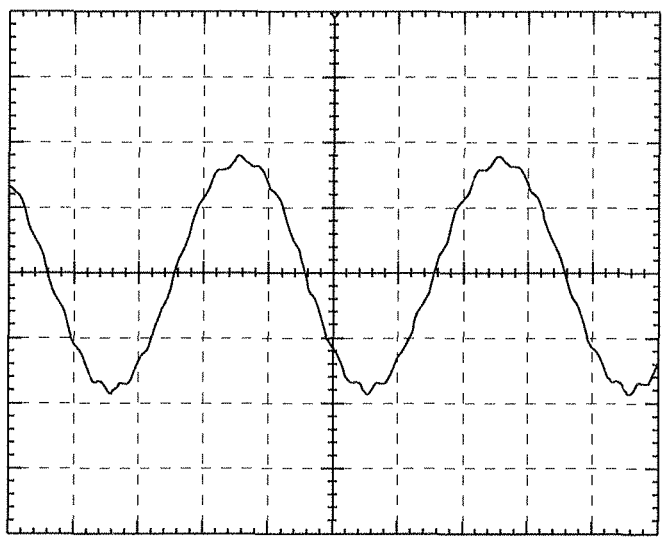
FIG. 9 is a graph of a current provided to a motor containing a harmonic cancellation component using the techniques described herein for an exemplary case.
Figure 10:
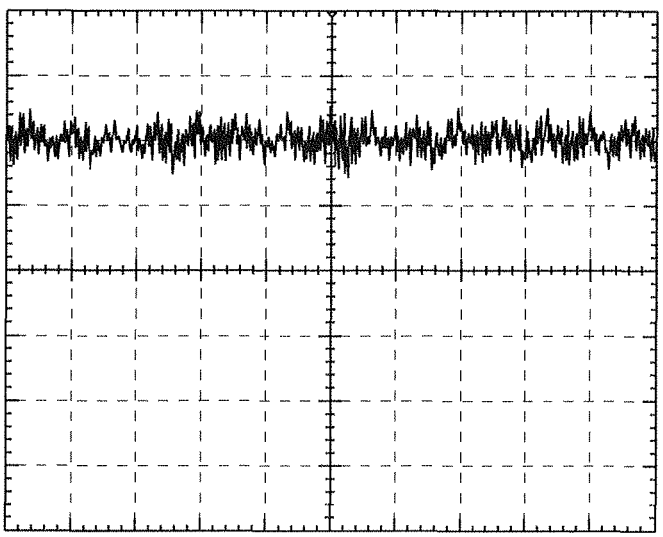
FIG. 10 is a graph of the torque produced by the motor in response to the current of FIG. 9 for an exemplary case.
Figure 11:
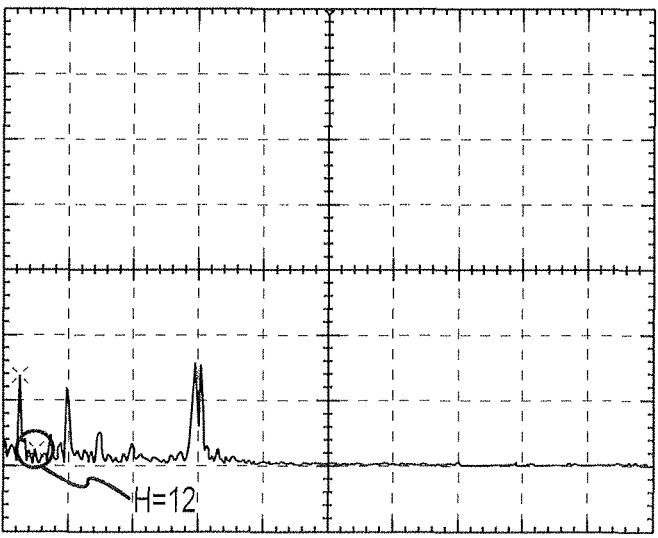
FIG. 11 is a graph of a fast Fourier transform (FFT) of the motor torque in FIG. 10 for an exemplary case.

Referring now to FIGS. 6-11, for an exemplary case, when the harmonic cancellation command block is not active and a sinusoidal current shown in FIG. 6 is provided to the motor, the motor torque exhibits a ripple component as shown in FIG. 7. FIG. 8 illustrates a fast Fourier transform (FFT) of the torque ripple in FIG. 7 which reveals torque ripple produced by a dominant harmonic of the fundamental electrical frequency corresponding to the 12$^{th}$ harmonic. As shown in FIG. 9, when the harmonic cancellation command block is enabled with H=12, the current provided to the motor is distorted rather than purely sinusoidal as a result of the harmonic cancellation current provided to the current regulated control module. In response to the harmonic cancellation command, the motor produces a smoother torque and torque ripple oscillations are notably reduced as shown in FIG. 10. As shown in FIG. 11, an FFT of the motor torque in FIG. 10 reveals the harmonic cancellation command block with H=12 effectively cancels the 12$^{th}$ harmonic.

It should be understood that the exemplary embodiment shown is solely for the purpose of illustration, and the electric motor system may be adapted to include additional harmonic cancellation command blocks, or the harmonic cancellation command block may be adapted (i.e., by replicating the individual component blocks) in order to target additional harmonics and further reduce the torque ripple. Thus, in alternative embodiments, one or more harmonic cancellation command blocks may be utilized to generate commands to cancel multiple harmonics.

One advantage of the methods and/or systems described above is that the electric motor system produces a smoother torque at low motor speeds. Furthermore, compensating for the attenuation and phase shift introduced by the current regulated control module allows the harmonic cancellation command to be faithfully tracked by the synchronous frame current regulator as the fundamental electrical frequency increases. Other embodiments may utilize the systems and methods described above in different types of automobiles, different vehicles (e.g., watercraft and aircraft), or in different mechanical systems altogether, as it may be implemented in any situation where torque ripple harmonics exist.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for reducing torque ripple in an electric motor for use in an electric motor drive system for a vehicle, wherein the electric motor is coupled to an inverter, which is coupled to a current regulated control module, wherein the inverter is configured to drive the electric motor, the method comprising:
    receiving a torque command;
    determining a cancellation current command based on the torque command;
    generating a harmonic cancellation command based on the cancellation current command, wherein the harmonic cancellation command is generated to compensate for a phase shift and an attenuation introduced by the current regulated control module; and
    providing the harmonic cancellation command to the current regulated control module, wherein the current regulated control module is configured to control the inverter in response to the harmonic cancellation command and the torque command.

2. The method of claim 1, the electric motor having an electrical angular velocity and a motor speed and including a rotor having a position, wherein generating the harmonic cancellation command further comprises:
    identifying a first ripple harmonic, the first ripple harmonic representing a multiple of a fundamental electrical frequency of the electric motor;
    modifying a phase angle of the cancellation current command based on the first ripple harmonic, the electrical angular velocity, and the position of the rotor; and
    modifying a magnitude of the cancellation current command based on the electrical angular velocity and the first ripple harmonic.

3. The method of claim 2, wherein modifying the phase angle further comprises adding a compensating phase shift governed by $$H \times \theta_r + \tan^{-1}\left(\frac{H \cdot \omega_e}{\omega_{bw}}\right),$$

wherein H is the first ripple harmonic, $\theta_r$ is the position of the rotor, $\omega_e$ is the electrical angular velocity, and $\omega_{bw}$ is a bandwidth of the current regulated control module.

4. The method of claim 2, wherein modifying the magnitude further comprises multiplying the magnitude by $$\sqrt{1 + \left(\frac{H \cdot \omega_e}{\omega_{bw}}\right)^2},$$

wherein H is the first ripple harmonic, $\omega_e$ is the electrical angular velocity, and $\omega_{bw}$ is the bandwidth of the current regulated control module.

5. The method of claim 2, further comprising disabling the harmonic cancellation command if the motor speed is greater than a threshold speed.

6. A method for reducing torque ripple in an electric motor in response to a torque command, wherein the electric motor is coupled to an inverter, which is coupled to a current regulated control module, wherein the inverter is configured to drive the electric motor, the method comprising:
    determining a harmonic cancellation command based on the torque command, wherein the harmonic cancellation command is adjusted to compensate for a phase shift introduced by the current regulated control module; and
    providing the harmonic cancellation command to the current regulated control module.

7. The method of claim 6, wherein determining the harmonic cancellation command further comprises:
    determining a cancellation current command based on the torque command, wherein the cancellation current command is a polar quantity having a magnitude and a cancellation phase angle; and
    identifying a first ripple harmonic, the first ripple harmonic representing a multiple of a fundamental electrical frequency of the electric motor, wherein the harmonic cancellation command is determined based on the cancellation current command and the first ripple harmonic.

8. The method of claim 7, wherein the electric motor further includes a rotor having a position, wherein determining the harmonic cancellation command further comprises:
    generating a harmonic phase angle based on the first ripple harmonic and the position of the rotor;
    generating a compensating phase shift based on the first ripple harmonic, an electrical angular velocity of the electric motor and a bandwidth of the current regulated control module; and
    adding the harmonic phase angle, the compensating phase shift, and the cancellation phase angle to create a harmonic cancellation phase angle.

9. The method of claim 8, wherein generating the harmonic phase angle is governed by $H \times \theta_r$, wherein H is the first ripple harmonic, and $\theta_r$ is the position of the rotor.

10. The method of claim 8, wherein generating the compensating phase shift is governed by $$\tan^{-1}\left(\frac{H \cdot \omega_e}{\omega_{bw}}\right),$$

wherein H is the first ripple harmonic, $\omega_e$ is the electrical angular velocity, and $\omega_{bw}$ is the bandwidth of the current regulated control module.

11. The method of claim 7, wherein determining the harmonic cancellation command further comprises generating an adjusted magnitude based on the first ripple harmonic, an electrical angular velocity of the electric motor, and a bandwidth of the current regulated control module.

12. The method of claim 11, wherein generating the adjusted magnitude further comprises multiplying the magnitude by $$\sqrt{1 + \left(\frac{H \cdot \omega_e}{\omega_{bw}}\right)^2},$$

wherein H is the first ripple harmonic, $\omega_e$ is the electrical angular velocity, and $\omega_{bw}$ is the bandwidth of the current regulated control module.

13. The method of claim 7, wherein determining the cancellation current command based on the torque command further comprises obtaining the cancellation current command from a lookup table, the lookup table having stored therein a plurality of current cancellation commands based on characteristics of the electric motor, the plurality of current cancellation commands corresponding to a plurality of possible torque commands.

14. The method of claim 7, wherein determining the cancellation current command based on the torque command further comprises performing a polynomial curve fitting operation on the torque command, wherein the polynomial curve fitting operation is based on characteristics of the electric motor.

15. The method of claim 7, further comprising:
identifying a second ripple harmonic, the second ripple harmonic representing a second multiple of the fundamental electrical frequency;
determining a second harmonic cancellation command based on the cancellation current command and the second ripple harmonic; and
providing the second harmonic cancellation command to the current regulated control module.

16. The method of claim 7, wherein identifying the first ripple harmonic further comprises selecting an integer multiple of the fundamental electrical frequency, the integer multiple representing a harmonic of the fundamental electrical frequency that causes torque ripple.

17. The method of claim 7, further comprising:
converting the harmonic cancellation command to a rectangular coordinate command; and
providing the rectangular coordinate command to the current regulated control module.

18. The method of claim 6, wherein the electric motor has a motor speed, and the method further comprises disabling the harmonic cancellation command if the motor speed is greater than a threshold speed by modifying a magnitude of the harmonic cancellation command by a scaling factor based on the motor speed such that the magnitude is reduced to zero when the motor speed reaches the threshold speed.

19. A controller for reducing torque ripple in an electric motor in response to a torque command, the electric motor being coupled to an inverter, the controller comprising:
a current regulated control module, wherein the current regulated control module generates control signals for the inverter in response to the torque command; and
a harmonic cancellation command block coupled to the current regulated control module, the harmonic cancellation command block being configured to generate a harmonic cancellation command for the current regulated control module to reduce a torque ripple harmonic, wherein the harmonic cancellation command is generated to compensate for a phase shift introduced by the current regulated control module.

20. The controller of claim 19, further comprising a deactivation block configured to disable the harmonic cancellation command if the speed of the electric motor is greater than a threshold speed.

* * * * *